Nov. 1, 1932.  E. B. NEWILL  1,885,621
ELECTRICAL APPARATUS
Filed Oct. 17, 1930
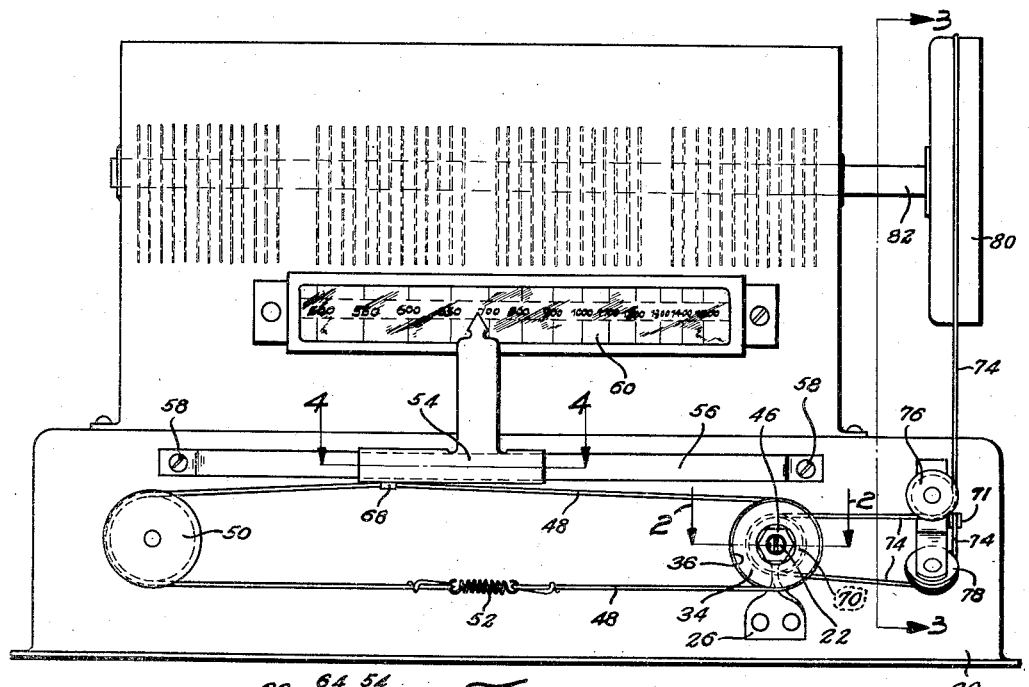
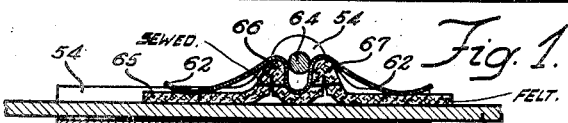
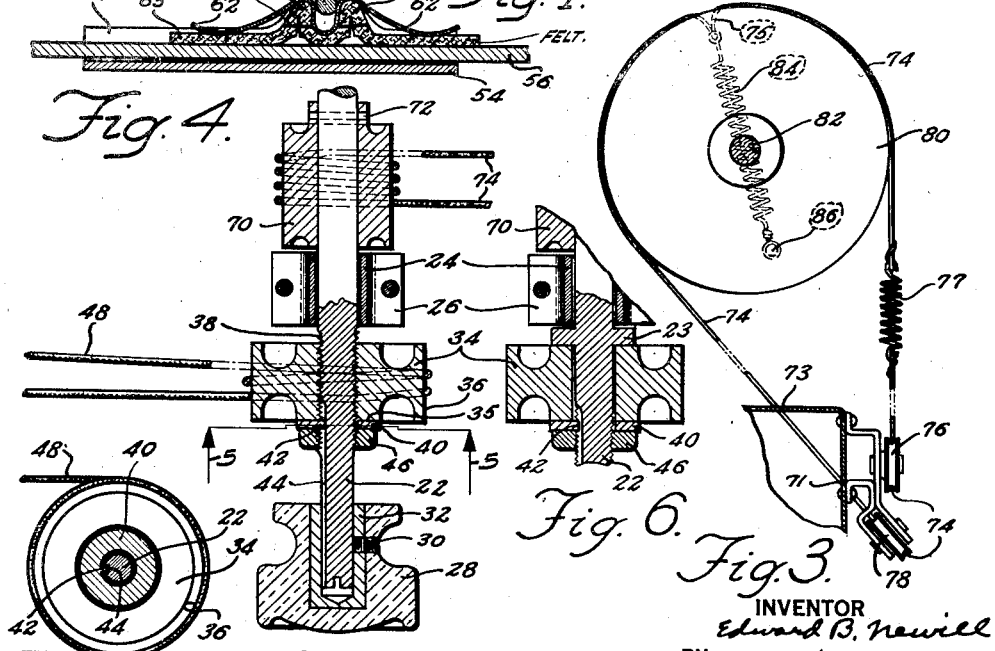
INVENTOR
Edward B. Newill
BY
His ATTORNEYS Patented Nov. 1, 1932

1,885,621

UNITED STATES PATENT OFFICE

EDWARD B. NEWILL, OF DAYTON, OHIO, ASSIGNOR TO GENERAL MOTORS RADIO CORPORATION, OF DAYTON, OHIO, A CORPORATION OF OHIO

ELECTRICAL APPARATUS

Application filed October 17, 1930. Serial No. 489,316.

This invention relates to a control mechanism for a radio receiver and more particularly to the adjusting means for setting the indicator indicating the signal received or the like.

An object of this invention is to provide an adjusting means for the control that is reliable, easily constructed, easily adjusted and cheap to manufacture. This has been accomplished by providing an adjustable impedance mechanism, an indicating mechanism for indicating the setting of said impedance, a screw threaded shaft for driving one of said mechanisms, a rotary member screw threadedly engaging said shaft, said rotary member rotating with the shaft and moving in cooperation with said other mechanism, an adjusting means for adjusting said rotary member on said shaft, said means including a lock nut carried by said shaft, and a washer having a detent engaging a key way so as to be non-rotatable with respect to said shaft, said washer being mounted intermediate said rotary member and said lock nut so as to prevent relative rotary movement between said rotary member and said shaft when the lock nut is tightened and so as to permit relative movement between said rotary member and said shaft when loosened.

Further objects and advantages of the present invention will be apparent from the following description, reference being had to the accompanying drawing, wherein a preferred embodiment of one form of the present invention is clearly shown.

In the drawing:

Fig. 1 represents a front view of a radio chassis.

Fig. 2 is a sectional view taken on line 2—2 of Fig. 1 and drawn to an enlarged scale.

Fig. 3 is a fragmentary sectional view taken on the line 3—3 of Fig. 1.

Fig. 4 discloses an enlarged fragmentary sectional view, taken on the line 4—4 of Fig. 1.

Fig. 5 is a sectional view taken on the line 5—5 of Fig. 2.

Fig. 6 is another modification.

Referring to the drawing, a chassis 20 provides one bearing (not shown) for a shaft 22. A second bearing 24 is supported by a bracket 26 which is secured to the front wall of the chassis. Referring more particularly to Fig. 2 a control knob 28 of any suitable moulding material, as for instance bakelite, is rigidly connected to the free end of the shaft 22 by a set screw 30, threaded into the knob 28 and a bushing 32 which is moulded therein and takes up most of the back pressure of the set screw 30.

A pulley 34 having either a smooth peripheral surface 36 or a groove surface, if desired, threadedly engages the threaded portion 38 of the shaft 22. Instead of being threaded on the shaft 22 the pulley could abut a stop on the shaft 22 such as a collar 23 or the like as disclosed in Fig. 6. A washer 40, having a key-like extension 42 that projects into an axial slot or key-way 44 in the shaft 22 is placed between a hub 35 of the pulley 34 and a lock nut 46. A flexible cable 48 attached to the pulley 34 by any suitable interlocking means (not shown) wound around pulley 34 in several layers is passed over a grooved idler pulley 50.

The cable 48 receives enough tension from a spiral spring 52, connecting both ends of said cable 48, to tightly engage the pulleys 34 and 50.

Referring more particularly to Figs. 1 and 4, an indicating member 54 is slidably mounted upon a guide bar 56 which is fastened to the chassis 20 by screws 58. This indicating member 54, travelling in front of a scale 60, indicating various wave lengths or frequencies of radio signals or the like, is held in proper position by a leaf spring 62, which is constantly held under tension by projecting the same between a stud 64, fastened to the indicating member 54, and a felt pad 65 or the like, which slides upon the inner surface of guide bar 56. This felt pad 65 is crimped twice, so as to provide two extensions 66 and 67, each of which is sewed together and project on each side of a U-shaped middle portion of the leaf spring 62 so as to hold the felt pad in position. This indicating member 54 is connected with the driving cable 48 at 68 in any suitable manner.

It is obvious that manual turning of knob 28 in either direction causes indicating member 54 to slide upon the guide bar 56 in proper direction without any lost motion between the knob 28 and said indicating member 54.

Referring more particularly now to Figs. 2 and 3, the shaft 22 also carries a second pulley 70 of any suitable diameter secured to the shaft 22 by a pin 72 or the like. A flexible driving cable 74 is wound around the pulley 70 in several convolutions and suitably attached thereto. The cable 74 also passes over guide pulleys 76 and 78 and is attached to a drum 80 by a spring 84, which has one end engaging a loop 75 of the cable 74 and the other end fixed to a stud 86 in the drum 80. A spring 77 connects both free ends of the cable 74, giving the driving cable 74 the necessary tension. The shaft 82 has fixedly attached thereto a gang condenser 83 that may be adjusted by the drum 80 fixedly attached to the shaft 82. Instead of gang condensers other impedances, such as variable inductances or resistances that either tune the circuit or adjust the circuit so as to change either the quality or the quantity output may be used.

Constructive circumstances make it necessary to lead the cable 74 through the frame of the chassis 20 at 71 and 73.

It is now obvious that manually turning the knob 28 causes the drum 80 to turn without practically any lost motion between the said knob and the drum 80.

While a specific embodiment of this invention is herein disclosed and described, the reason for having a washer 40 with the said key-like extension 42 will now be explained. The washer 40 interposed between the pulley 34 and the lock nut 46 does not allow these members to turn in unison upon the shaft as long as the lock nut is tight, for the reason that the washer 40 can not rotate on the shaft 22 in that the extension 42 is located in the slot 44.

It is therefore obvious that only the axial component of the tightened nut 46 is transmitted to the pulley 34 thereby preventing its rotation.

From the foregoing structure it can be readily seen that when the indicator does not point to the particular frequency or wave-length to which the condenser is turned, the pointer 54 may be adjusted by loosening nut 46, then rotating the pulley 34 either clockwise or counterclockwise on the shaft 22 as needed to set the indicator 54. The nut 46 is then tightened so as to lock the pulley 34 in a relatively fixed relation with respect to the shaft 22. This provides dependable, efficient, simple and cheap adjusting means for properly indexing the pointer or indicator. Instead of being used with a slidable indicator the same type of adjusting mechanism may be used with a rotary dial or another indicating mechanism. Instead of a cable drive any other suitable drive may be used within the scope of this invention.

While the form of embodiment of the present invention as herein disclosed, constitutes a preferred form, it is to be understood that other forms might be adopted, all coming within the scope of the claims which follow.

What is claimed is as follows:

1. A control for a radio receiver comprising in combination, an adjustable impedance mechanism, an indicating mechanism for indicating the setting of said impedance, a screw threaded shaft for driving one of said mechanisms, said shaft having an axial keyway, a rotary member screw threadedly engaging said shaft, said rotary member rotating with the shaft and moving in cooperation with said other mechanism, and adjusting means for adjusting said rotary member on said shaft, said means including a lock nut carried by said shaft, and a washer having a detent engaging said key-way so as to be non-rotatable with respect to said shaft, said washer being mounted intermediate said rotary member and said lock nut so as to prevent relative rotary movement between said rotary member and said shaft when the lock nut is tightened and permits a relative movement between said rotary member and said shaft when loosened so as to permit adjustment of the relative position of the indicating mechanism with respect to the setting of the impedance mechanism.

2. A control for a radio receiver comprising in combination an adjustable impedance mechanism; an indicating mechanism for indicating the setting of the impedance mechanism; and connecting means for connecting said mechanisms, said connecting means including a screw threaded shaft driving one of said mechanisms, a rotary member rotatably mounted on said shaft and limited in axial movement thereon, said rotary member actuating said other mechanism and a lock nut threaded on said shaft for locking said rotary member on said shaft when the indicating mechanism has been adjusted with respect to said impedance mechanism whereby relative movement between the shaft and the rotary member is prevented.

3. A control for a radio receiver comprising in combination an adjustable impedance mechanism; an indicating mechanism for indicating the setting of the impedance mechanism; a control; and connecting means for connecting the control to each of said mechanisms, said connecting means including a screw threaded shaft having a key-way; a rotary member rotatably mounted on said shaft for adjustment and axially limited in movement thereon, said member actuating said other mechanism; a lock nut threaded on said shaft and a washer having a detent engaging said key-way mounted intermediate said lock nut and said rotatable member so that said washer is non-rotatably mounted on said shaft but freely movable axially whereby as the lock nut is tightened said rotary member is prevented from rotating with respect to said shaft.

In testimony whereof I hereto affix my signature.

EDWARD B. NEWILL.